Sept. 18, 1923.
R. MAEDA
1,468,572
FISHHOOK
Filed Dec. 3, 1921
 
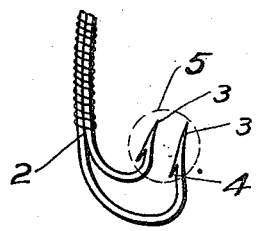 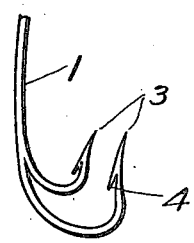
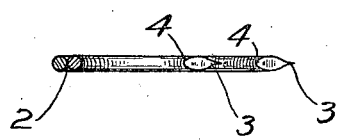
INVENTOR
Rinsai Maeda
BY
Mason Fenwick & Lawrence
ATTORNEY Patented Sept. 18, 1923.

1,468,572

UNITED STATES PATENT OFFICE.

RINSAI MAEDA, OF SEATTLE, WASHINGTON.

FISHHOOK.

Application filed December 3, 1921. Serial No. 519,792.

*To all whom it may concern:*

Be it known that I, RINSAI MAEDA, a subject of the Emperor of Japan, residing at Seattle, in the county of King and State of Washington, have invented certain new and useful Improvements in Fishhooks; and I do hereby declare the following to be a full, clear, and exact description of the invention, such as will enable others skilled in the art to which it appertains to make and use the same.

This invention relates to fish hooks, and more particularly to fish hooks having a plurality of points and barbs attached to a single shank.

The main object of the invention is to provide a fish hook with more than one point, and with holding barbs on each of the points, and each point extending from the shank in the same plane from the said side of the shank.

A further object of the invention is to provide a fish hook having a single shank and a plurality of points with barbs extending in the same direction and supported from the shank, said points being extended to substantially the same level relative to said shank and lying in a common plane with and approximately parallel to said shank whereby fragile bait may be properly positioned to cover the points and barbs and also to more securely hold a fish when one is hooked.

In fishing with the ordinary hook and line, the fish with soft parts about the mouth are frequently able to dislodge themselves from a single pointed hook, by tearing out the single point; and in other instances where tender bait is used, such as large fish eggs (as from the salmon), as is common in the western waters for trout, the fish are frequently able to dislodge the bait and remove the same when only a single point is provided for supporting the egg or bait. With my invention an egg bait may be more securely held by the several associated points, and other bait such as worms may be threaded on the several points adjoining, or may be massed in a ball as is desirable for some kinds of fishing.

I have described my invention by drawing, in which:

Figure 1 is a side elevation of the double pointed hook with a divided shank, held together by suitable wrappings, with an outline of an egg bait on the points, all enlarged;

Fig. 2 is a side elevation of similar hook with single shank;

Fig. 3 is a top plan of Fig. 1, with upper part removed.

Like numerals on the different figures represent like parts.

1, is the ordinary shank for connection with line, made in a single piece or made by connecting two parts by wrapping a cord or wire 2 to hold the two parts securely together, as shown in Fig. 1. Two or more points 3 extend in the same plane from the shank, and have suitable holding barbs 4, and the points suitably spaced apart and extending to substantially the same level relative to the shank and lying in a common plane with and approximately parallel to said shank for holding single bait, as salmon egg, outlined as at 5. The plurality of points are less likely to press up through the upper skin of the egg and so protrude beyond the bait line, and when a fish is hooked on both points, it is held so securely that it cannot dislodge itself as from a single point.

I claim:

A fish hook comprising a single shank and a plurality of points with barbs extending in the same direction and supported from the shank, said points being extended to substantially the same level relative to said shank and lying in a common plane with and approximately parallel to said shank.

In testimony whereof I affix my signature.

RINSAI MAEDA.